G. L. CASTNER, Jr.
FEEDING DEVICE.
APPLICATION FILED APR. 1, 1920.
1,354,802. Patented Oct. 5, 1920.
FIG_1_
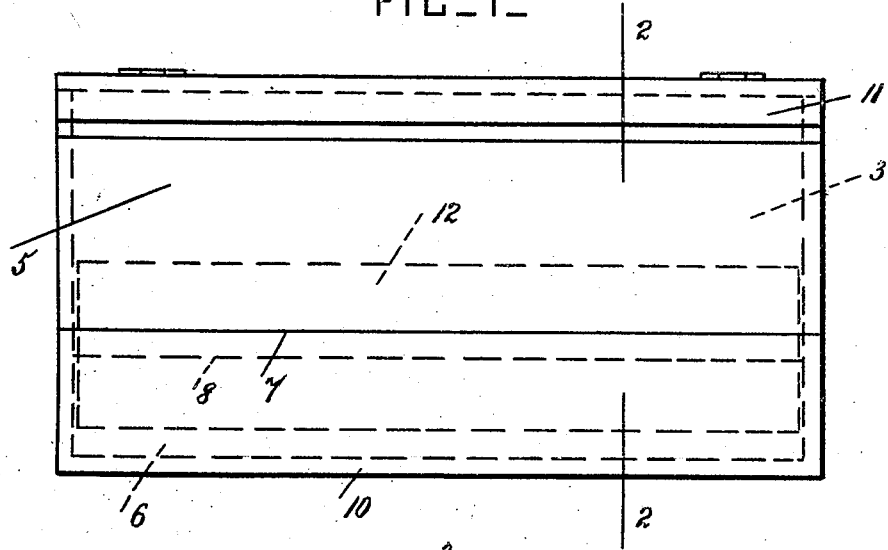
FIG_2_
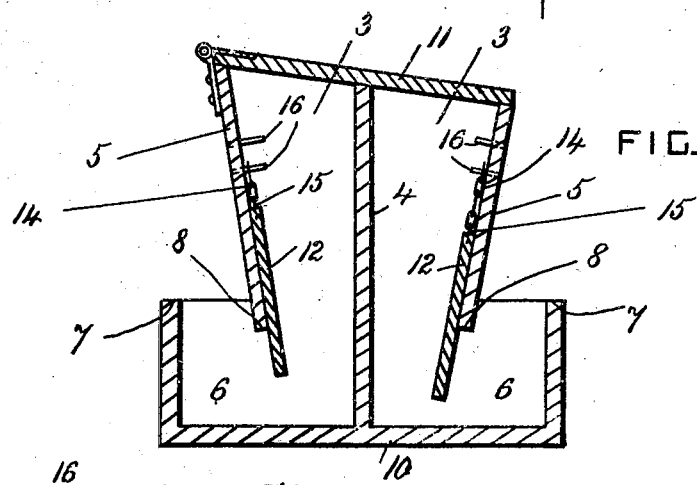
FIG_3_
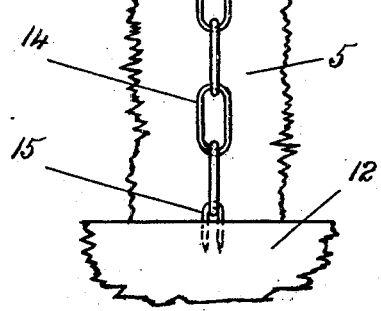
Inventor.
George L. Castner Jun.
by Herbert W. P. Jenner.
Attorney.

UNITED STATES PATENT OFFICE.

GEORGE LEWIS CASTNER, JR., OF CLARKSVILLE, TENNESSEE.

FEEDING DEVICE.

1,354,802.  Specification of Letters Patent.  Patented Oct. 5, 1920.

Application filed April 1, 1920. Serial No. 370,460.

*To all whom it may concern:*

Be it known that I, GEORGE L. CASTNER, Jr., a citizen of the United States, residing at Clarksville, in the county of Montgomery and State of Tennessee, have invented certain new and useful Improvements in Feeding Devices, of which the following is a specification.

This invention relates to feeding devices or boxes for domestic animals in which the delivery of the feed is proportioned automatically to the needs of the animals; and it consists in the novel construction and combination of the parts hereinafter fully described and claimed whereby the feed plate is supported and adjusted.

In the drawings, Figure 1 is a front view of a feeding device constructed according to this invention. Fig. 2 is a cross-section through the device, taken on the line 2—2 in Fig. 1. Fig. 3 is a detail front view of a portion of a feed plate and one of its supporting chains, drawn to a larger scale.

A feed supply chamber 3 is provided, and it has a vertical back 4, and an inclined front side 5 so that it is broadest at its top. The drawings show two similar feeding devices arranged back to back and having a single back 4 common to both. A feed box 6 is formed at the lower part of the supply chamber, and its top edge 7 is arranged above the level of the bottom edge 8 of the front side 5. This bottom edge 8 is arranged at a predetermined distance above the bottom 10 of the feed box 6, so that the feed passes from the supply chamber into the front part of the feed box automatically as fast as the animals remove it from the feed box. A hinged lid 11 is provided at the top of the supply chambers, and is a single lid common to both.

A plate 12 for regulating the supply of feed is arranged to rest against the inclined side of the supply chamber, and projects below its bottom edge 8. This plate 12 is provided with two short chains 14 secured to its upper edge by staples 15, and the front side 5 has projecting pins 16 for engaging with any of the links of these chains. Each chain preferably consists of three long links, but as many links as desirable may be used. The position of the plate 12 can be varied by raising and lowering it bodily by hand, and slipping those links of the chains onto the pins which will support it at the desired position.

The chains permit the plate 12 to be vibrated by the animals in the act of removing feed from the feed box, so that the feed in the supply chamber is agitated sufficiently to cause it to be fed from the supply chamber into the front part of the feed box.

What I claim is:

1. In a feeding device, a supply chamber having an inclined side, a feed box which projects at the lower front part of the inclined side, a feed plate which rests on the said inclined side and projects below it, chains attached to the said plate, and pins which project from the said inclined side and which are adapted to engage with any of the links of the chains and support the said plate pivotally.

2. A feeding device, comprising two similar supply chambers having a back common to both, and a single hinged lid also common to both, each said chamber having an inclined side, a feed box which projects at the lower part of each inclined side, feed plates which rest on the inclined sides and project below them, chains attached to the feed plates, and pins which project from the said inclined sides and which are adapted to engage with any of the links of the chains and support the said plates pivotally.

In testimony whereof I have affixed my signature.

GEORGE LEWIS CASTNER, JR.